United States Patent
Chen et al.

(10) Patent No.: US 11,403,535 B2
(45) Date of Patent: Aug. 2, 2022

(54) MODEL-BASED MACHINE LEARNING SYSTEM

(71) Applicant: INDUSTRIAL TECHNOLOGY RESEARCH INSTITUTE, Hsinchu (TW)

(72) Inventors: Ying-Hsiang Chen, Zhunan Township (TW); Cheng-Ying Liu, Tainan (TW); Tsung-Sheng Kuo, Budai Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 894 days.

(21) Appl. No.: 16/230,116

(22) Filed: Dec. 21, 2018

(65) Prior Publication Data
US 2020/0202235 A1    Jun. 25, 2020

(51) Int. Cl.
*G06N 5/04* (2006.01)
*G06N 20/00* (2019.01)
(Continued)

(52) U.S. Cl.
CPC .............. *G06N 5/04* (2013.01); *B29C 45/76* (2013.01); *G06F 7/588* (2013.01); *G06F 17/18* (2013.01);
(Continued)

(58) Field of Classification Search
CPC .......... G06N 5/04; G06N 20/00; G06F 30/20; G06F 7/588; G06F 17/18; B29C 45/76; B29C 2945/76949
See application file for complete search history.

(56) References Cited

U.S. PATENT DOCUMENTS

| 2009/0053546 A1 | 2/2009 | Di Domenico |
| 2011/0106285 A1 | 5/2011 | Catoen et al. |

(Continued)

FOREIGN PATENT DOCUMENTS

| CN | 109101698 A | * 12/2018 |
| JP | 2006289874 A | * 10/2006 |

(Continued)

OTHER PUBLICATIONS

Taiwanese Office Action and Search Report for Taiwanese Application No. 107146534, dated Oct. 25, 2019.
(Continued)

*Primary Examiner* — Casey R. Garner
(74) *Attorney, Agent, or Firm* — Birch, Stewart, Kolasch & Birch, LLP

(57) ABSTRACT

A model-based machine learning system for calculating optimum molding conditions includes a data storage device providing a set of training data; an injection molding process emulator producing a set of emulated sensing data according to molding conditions as inputted; an injection molding process state observation unit, determining an injection molding process state from molding conditions, sensing data and a quality state, wherein the quality state at least includes an acceptance state; and an injection molding process optimization unit including an injection molding condition optimizer, wherein a molding condition optimization model constructed in the injection molding condition optimizer is trained according to the injection molding process state as (Continued)

determined, and the molding condition optimization model after training is introduced into an injection molding production line.

20 Claims, 3 Drawing Sheets

(51) Int. Cl.
  *G06F 17/18* (2006.01)
  *G06F 7/58* (2006.01)
  *B29C 45/76* (2006.01)
  *G06F 30/20* (2020.01)

(52) U.S. Cl.
  CPC ............ *G06F 30/20* (2020.01); *G06N 20/00* (2019.01); *B29C 2945/76949* (2013.01)

(56) References Cited

U.S. PATENT DOCUMENTS

| | | | |
|---|---|---|---|
| 2016/0250791 A1 | 9/2016 | Schiffers et al. | |
| 2017/0031330 A1* | 2/2017 | Shiraishi | B29C 45/762 |
| 2018/0137415 A1 | 5/2018 | Steinberg et al. | |
| 2018/0181694 A1* | 6/2018 | Springer | B29C 45/766 |
| 2018/0281256 A1* | 10/2018 | Asaoka | G06N 20/00 |

FOREIGN PATENT DOCUMENTS

| | | | |
|---|---|---|---|
| JP | 2017081071 A | * | 5/2017 |
| TW | 567132 | | 11/2003 |
| TW | 200424052 | | 11/2004 |

OTHER PUBLICATIONS

Fort, "Gauging the performance of the synthesizing data related to the machine learning", Aug. 21, 2018, 21 pages total, along with an English translation.

Abeykoon et al., "A new model based approach for the prediction and optimisation of thermal homogeneity in single screw extrusion", Control Engineering Practice, vol. 19, 2011, pp. 862-874 (13 pages).

Gao et al., "Online product quality monitoriing through in-process measurement", CIRP Annals—Manufacturing Technology, vol. 63, 2014, pp. 493-496 (4 pages).

Stanek et al, "Optimization of Injection Molding Process", International Journal of Mathematics and Computers in Simulation, vol. 5, No. 5, 2011, pp. 413-421 (9 pages).

\* cited by examiner

MODEL-BASED MACHINE LEARNING SYSTEM

TECHNICAL FIELD

The disclosure relates to a model-based machine learning system for calculating optimum molding conditions of injection molding.

BACKGROUND

Injection molding is a complicated process. Taking plastic injection molding as an example, it is a result of a series of steps such as plasticizing the polymer material, injecting the plasticized material into a cavity under a pressure, packing, cooling and ejecting. Many different factors affect the quality of the molding products. In practice, during the time from initial molding to stable mass production, it requires a series of testing and adjusting the molding conditions to make sure that the molding products with appropriate the molding conditions can be meet the requirements of acceptance state. Even the adjustment of the molding conditions is initially completed, the qualities of molding products will be varied due to variations in the production environment. Currently, the experiences of the operators have been relied upon to adjust and optimize the molding conditions, thereby stabilizing the qualities of molding products. However, the methods for adjusting the molding conditions are different, it is not easy to train and bring a worker into an experienced operator, and the factors such as the learning curves of the operators of the new injection molding equipment have to be considered. Additionally, the labor cost is high, and it is difficult to control the qualities of molding products. How to overcome these difficulties is one of the important projects that need to be solved in the molding manufacturing industry.

Practically, the molding manufacturing industry faces the problems mainly including the increasingly complex product design, the shrinking of the molding process window, the quality of finished products being affected more easily by the molding environment, and the reduction of molding stability and yield of production. Moreover, the degree of customization of today's products has been increased, and the trend for manufacturing small amounts of different products leads to the increased frequency for changing the production lines, and it requires a large amount of operators to optimize the molding conditions and stabilize the qualities of molding products, so that the labor cost is greatly increased.

Taking the conventional injection molding process as an example, the problems encountered in the molding parameter optimization method are that, for example, optimization of several molding conditions simultaneously for obtaining the products in an acceptance state (the more complicated the product design, the smaller the molding process window and the more the acceptance conditions) is not easy, and it is necessary to predetermine more of the marked data for easily obtaining the quantitative quality of the molding product; however, it is difficult to collect the marked data. Also, the difficulties encountered in the conventional injection molding process include the difficulty of evaluating the pros and cons of the molding conditions. Even the experienced operators/engineers in the injection molding process cannot confirm the pros and cons of the molding conditions. Moreover, the trend for manufacturing small amounts of different products makes it difficult to effectively accumulate a large number of samples for supporting the conventional learning method of the molding equipment. Additionally, most of the quality data for evaluating the molding products, such as the data related to burrs and warpage, are not easy to measure and obtain. Even the adjustment of the molding conditions is initially completed, the qualities of molding products will be varied due to variations in the production environment. Currently, although the experiences of the operators have been relied upon to adjust and optimize the molding conditions, it has many problems such as high labor cost and difficulty of product quality control to be solved.

SUMMARY

The disclosure is directed to a model-based machine learning system. By introducing artificial intelligence technology, a model related to the variation of production environment can be constructed based on the historical data, and the molding conditions can be automatically optimized by using this model, thereby immediately compensating the variations of product qualities due to the changes of the molding environment.

According to one embodiment, a model-based machine learning system for calculating optimum molding conditions of injection molding is provided. The model-based machine learning system includes a data storage device for storing and processing data, wherein the data storage device stores and processes a raw data, and then provides a set of training data; an injection molding process emulator for generating a set of emulated sensing data according to molding conditions as inputted; an injection molding process state observation unit, determining an injection molding process state according to the molding conditions as inputted, the set of emulated sensing data and a quality state, wherein the quality state at least comprises an acceptance state; and an injection molding process optimization unit, comprising an injection molding condition optimizer based on a reinforcement learning algorithm, wherein a molding condition optimization model constructed in the injection molding condition optimizer is trained according to the injection molding process state as determined, and the molding condition optimization model after training is introduced into an injection molding production line.

Figure 1:
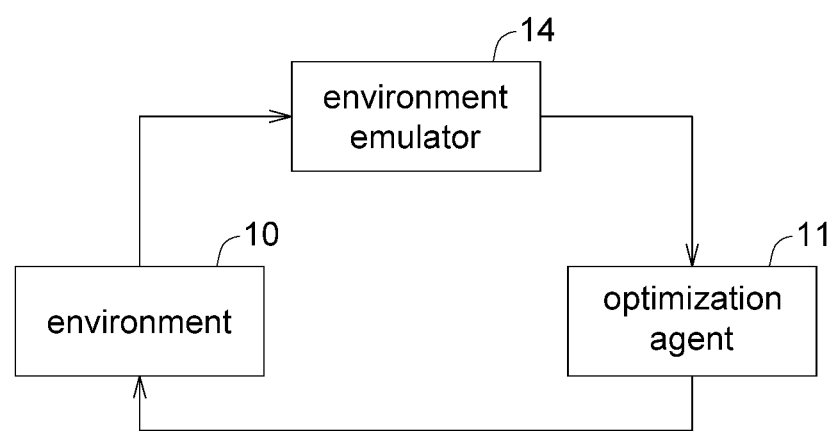
FIG. 1 illustrates a simple block diagram of a model-based machine learning system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the embodiments of the disclosure, a model-based machine learning system is provided for calculating the optimum molding conditions of injection molding, thereby solving the difficulties in evaluating the molding conditions for optimization in the injection molding processes, and also solving the problems of the big data required to deal with the artificial intelligence technical training stage. Moreover, the model-based machine learning system of the embodiment can instantly consider and acquire the quality of the molding products, so that the optimization of molding conditions can be conducted immediately. Also, the components such as the units, the identifiers and the selectors of the model-based machine learning system according to the embodiment (including the emulator, the observation unit and the optimization unit described herein, and the estimator, the generator, the inference engines, the identifiers, the selectors and the optimizers of these emulator and units thereof) can be implemented by one or more logic operation units and/or processors. Examples of the logic operation units and/or the processors may include (but are not limited to) one or more of a chip, a circuit, an electric circuit board and a recording medium storing several set of codes. FIG. 1 illustrates a simple block diagram of a model-based machine learning system. According to one embodiment of the disclosure, an environment 10 (such as actual data of molding injection) is provided by pre-designed experiments, so that an environment emulator 14 is able to obtain appropriate amount of marked data from the environment 10 and construct an operatable environment model. By interacting with the environment model, the optimization agent 11 of the system can still complete the learning process of optimization even when the environment interaction cannot be conducted immediately. Additionally, the optimizers of the optimization agent 11 that initially completes the learning can still be updated in time according to the actual data accumulated in the actual injection molding process, so as to immediately interact with the environment 10 for reinforcement learning. Accordingly, the model-based machine learning system of the embodiment can be applied for not only adjusting the molding conditions of injection molding, but also compensate the variations of the quality or characteristic values caused by the changes of the molding environment, thereby optimizing and stabilizing the molding quality of the injection products. Also, the optimizer's learning in the model-based machine learning system of the embodiment can be enhanced according to the requirements of the applications based on the accumulated actual data of the injection products, and the molding conditions can be re-optimized.

The embodiment is described in details with reference to the accompanying drawings for illustrating a model-based machine learning system of the disclosure. However, the disclosure is not limited to the units, the emulators, the models and the engines of the system as illustrated in the embodiment. It is noted that not all embodiments of the disclosure are shown, and there may be other embodiments which are not specifically illustrated are applicable as a model-based machine learning system of the disclosure. Modifications and variations can be made without departing from the spirit of the disclosure to meet the requirements of the practical applications. Thus, the specification and the drawings are to be regard as an illustrative sense rather than a restrictive sense.

Figure 2:
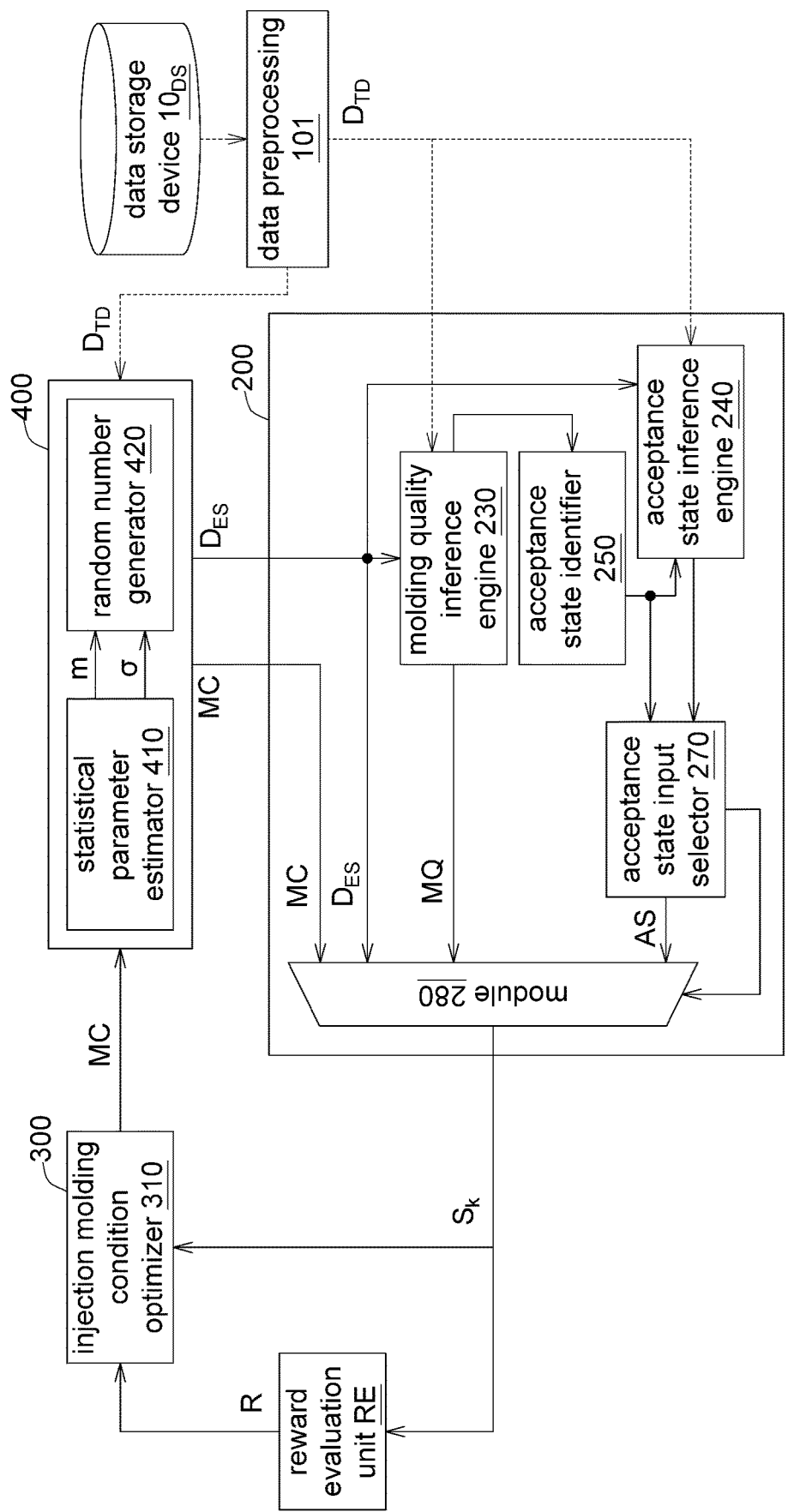
FIG. 2 depicts an exemplary model construction and learning flow of a model-based machine learning system according to one embodiment of the disclosure.

FIG. 2 depicts an exemplary model construction and learning flow of a model-based machine learning system according to one embodiment of the disclosure. Also, the block diagram of the model-based machine learning system as shown in FIG. 2 may correspond to the flow of interaction between the environment emulator 14 and the optimization agent 11 in FIG. 1.

As shown in FIG. 2, a model-based machine learning system for calculating optimum molding conditions of injection molding according to an embodiment comprises a data storage device $10_{DS}$, an injection molding process emulator 400, an injection molding process state observation unit 200 and an injection molding process optimization unit 300.

In one embodiment, the data storage device $10_{DS}$ is provided for storing and processing data, wherein the data storage device $10_{DS}$ stores and processes a raw data (such as the production raw data), and then provides a set of training data $D_{TD}$ after data preprocessing 101. In one example, the production raw data may comprise production rounds of actual injection molding, actual molding conditions, actual sensing data and quality states of actual products. The quality states of actual products mat include the classification results of acceptance state (such as classifying the products by labeling as True/False) and the quality data for evaluating each of the acceptance conditions. Examples of the quality data for evaluating the acceptance conditions of injection molding may include quantitative data such as burrs, warpage, weight, dimensions, and so on. Furthermore, in one example, the data preprocessing 101 may comprise (but is not limited to) the tools of data screening, data merging and data normalization.

According to one embodiment, the injection molding process emulator 400 generates a set of emulated sensing data $D_{ES}$ according to the molding conditions as inputted.

According to one embodiment, the injection molding process state observation unit 200 determines an injection molding process state $S_k$ according to the molding conditions MC as inputted, the set of emulated sensing data $D_{ES}$ and a quality state, wherein the quality state at least comprises an acceptance state.

In one embodiment, the injection molding process optimization unit 300 adopts an injection molding condition optimizer 310 based on a reinforcement learning algorithm, wherein a molding condition optimization model constructed in the injection molding condition optimizer 310 is trained according to the injection molding process state $S_k$ as determined. After training, the molding condition optimization model can be updated by offline training, or can be introduced into an injection molding production line for online learning.

Exemplifications of the injection molding process emulator 400, the injection molding process state observation unit 200 and the injection molding process optimization unit 300 are provided below for further illustration.

In one example, the injection molding process state observation unit 200 at least comprises an acceptance state inference engine 240, and an acceptance state classification model is constructed in the acceptance state inference engine 240 based on the set of training data $D_{TD}$. The acceptance state inference engine 240 infers the set of emulated sensing data $D_{ES}$ generated by the injection molding process emulator 400 according to the acceptance state classification model, thereby inferring a qualitative characteristic of a molding product with the set of emulated sensing data $D_{ES}$. Accordingly, the quality state obtained from the injection molding process state observation unit 200 at least comprises an acceptance state related to the inference result which is inferred by the acceptance state inference engine 240. In one example, the acceptance state inference engine 240 can be updated (but not limited thereto) after every production round of molding injection is completed.

It is noted that the injection molding process state observation unit 200 may comprise other inference engine(s) and/or selector(s) related to the quantitative quality and/or qualitative quality. The models constructed in those inference engine(s) and/or selector(s) can be provided to infer the results of quantitative characteristics (such as by a molding quality inference engine 230 as described hereinafter), and/or determine if a molding product with the inferred results of quantitative characteristics is an accepted product in the acceptance state (such as by an acceptance state identifier 250 and/or an acceptance state input selector 270 as described hereinafter). Examples of the models commonly constructed in the inference engines include methods of Support Vector Classifier, Linear Discriminant, Nearest Neighbors, Decision Tree, Random Forest, and Neural Network for data classification and analysis. However, the methods of the models applicable to the embodiment are not limited to the methods described above.

In one example, the injection molding process state observation unit 200 further comprises an acceptance state input selector 270. An acceptance state inference model is constructed in the acceptance state input selector 270, which determines if a molding product having the qualitative characteristic corresponding to the set of emulated sensing data $D_{ES}$ is an accepted product in the acceptance state or is a defective product not in the acceptance state after the set of emulated sensing data $D_{ES}$ of the molding product is inferred by the acceptance state inference engine 240; thus, the qualitative results of molding items can be obtained.

Moreover, in one example, the injection molding process state observation unit 200 further comprises a molding quality inference engine 230. Accordingly, the quality state obtained from the injection molding process state observation unit 200 comprises not only the result of acceptance state (inferred by at least the acceptance state inference engine 240), but also a result of quantitative characteristic (of molding quality) inferred by the molding quality inference engine 230. In one example, the molding quality inference engine 230 can be updated (but not limited thereto) after every production round of molding injection is completed.

In one example, the molding item quality inference model can be constructed in the molding quality inference engine 230 based on the set of training data. The molding quality inference engine 230 compares the molding item quality inference model to the set of emulated sensing data $D_{ES}$ generated by the injection molding process emulator 400, thereby inferring the result of quantitative characteristic of the molding product with the set of emulated sensing data $D_{ES}$.

Also, in one example, the injection molding process state observation unit 200 may further comprise an acceptance state identifier 250 and the molding quality inference engine 230. The acceptance state identifier 250 identifies the result of quantitative characteristic inferred by the molding quality inference engine 230 for quality identification. For example, if the value of burr (i.e. quantitative quality result) of a molding product as inferred by the molding quality inference engine 230 is greater than 2 mm, the acceptance state identifier 250 identifies that the molding product with that value related to the burr item does not meet the acceptance condition; if the value of burr of a molding product as inferred by the molding quality inference engine 230 is less than or equal to 2 mm, the acceptance state identifier 250 identifies that the molding product with that value related to the burr item does meet the acceptance condition. Acceptance conditions for several different quantitative items can be set in the acceptance state identifier 250 at the same time. Therefore, the acceptance state identifier 250 performs qualitative identification by identifying the result of quantitative characteristic (e.g. the qualitative result is obtained by inferring the quantitative result). Also, the acceptance state identifier 250 can transmit the result of qualitative characteristic as identified to the acceptance state input selector 270, and the acceptance state input selector 270 determines if the molding product corresponding to the result of qualitative characteristic is an accepted product in the acceptance state or a defective product not in the acceptance state. Accordingly, in this example, the quality state obtained from the injection molding process state observation unit 200 comprises the results of qualitative characteristic and quantitative characteristic. The result of qualitative characteristic can be obtained from the inference result of the acceptance state inference engine 240, and the qualitative identification of the acceptance state identifier 250 by identifying the result of quantitative characteristic (e.g. the result of quantitative characteristic is inferred by the molding quality inference engine 230), wherein the acceptance state of the molding product is determined by the acceptance state input selector 270.

Also, in one example, the injection molding process state observation unit 200 further comprises a module 280 coupled to the acceptance state input selector 270 and the injection molding condition optimizer 310, respectively. After inference, the inferred result of the quantitative item for the molding product inferred by the molding quality inference engine 230, such as the molding quality MQ, is transmitted to the module 280 for collection and analysis. Furthermore, the inferred result of the qualitative item for the molding product inferred by the acceptance state inference engine 240 and selected by the acceptance state input selector 270, such as the acceptance state AS, is also transmitted to the module 280 for collection and analysis.

In the embodiment, the injection molding process emulator 400 can construct a relational model of practical molding conditions and actual sensing data by using the historical data in actual molding process. Also, the injection molding process emulator 400 can simulate and output the sensing data for each of the molding items according to the molding conditions as inputted in every production round.

In one example, based on the related parameters (e.g. the practical molding conditions) and data distributions of the set of training data (i.e. the actual data), the injection molding process emulator 400 can simulate and infer the emulated sensing data $D_{ES}$ which are not presented in the actual data according to the molding conditions as inputted in the injection molding process emulator 400. Thus, by introducing the injection molding process emulator 400 of the embodiment to the model-based machine learning system, the acceptance state inference engine 240 or a combination of the acceptance state inference engine 240 and the molding quality inference engine 230 not only performs the quality inference or the quality and quantity inferences for the set of training data (i.e. the actual data), but also performs the quality inference or the quality and quantity inferences for the emulated sensing data $D_{ES}$ generated by the injection molding process emulator 400. Therefore, the injection molding process emulator 400 according to the embodiment can increase the amount of data (including actual data and emulated data for expanding the data pool) obtained by the injection molding process state observation unit 200. One of applicable simulation types of the injection molding process emulator 400 is provided below for illustration, but the disclosure is not limited thereto.

In one embodiment, the injection molding process emulator 400 comprises a statistical parameter estimator 410 and a random number generator 420. The statistical parameter estimator 410 constructs a relational model according to the practical molding conditions and individual actual sensing data distributions of the set of training data. For example, based on the practical molding conditions and statistics of the individual actual sensing data distributions of the set of training data, the statistical parameter estimator 410 of the injection molding process emulator 400 infers and estimates statistics of individual emulated sensing data distributions corresponding to the emulated molding conditions MC according to the emulated molding conditions MC inputted into the injection molding process emulator 400. The estimation method can be an interpolation method (such as Nearest Neighbor Interpolation, Linear Interpolation, Cubic or Cubic Spline Interpolation) or other applicable estimation methods. In one example, according to the statistics of the individual actual sensing data distributions each may comprise an average value (m) and a standard deviation ($\sigma$) of the actual data, the statistics of the individual emulated sensing data distributions can be estimated and obtained using any appropriated estimation method, such as an interpolation method or other applicable estimation methods, wherein each of the statistics of the individual emulated sensing data distributions may comprise an average value (m) and a standard deviation ($\sigma$) of the emulated data.

Based on the relational model constructed by the statistical parameter estimator 410, the random number generator 420 randomly generates a plurality of corresponding individual emulated sensing data according to emulated molding conditions as inputted into the injection molding process emulator 400. The corresponding individual emulated sensing data can be combined to form a set of emulated sensing data $D_{ES}$, and the set of emulated sensing data $D_{ES}$ can be provided to the injection molding process state observation unit 200. The random number generator 420 randomly generates a plurality of corresponding individual emulated sensing data (such as emulated filling time) according to the statistics of the individual emulated sensing data distributions as inferred and estimated, wherein several different emulated sensing data corresponding to one of the emulated molding conditions for one sensing item are generated.

Accordingly, input and output simulation by the injection molding process emulator 400 provides a one-to-many correspondence relationship; that is, different emulated sensing data corresponding to the same molding condition for the same sensing item can be generated. In the embodiment, input and output simulation of the injection molding process emulator 400 presents one-to-many correspondence relationship, which fits the real process conditions in the actual injection molding process. During the practical injection molding process, it is possible to generate different sensing data (such as different sensing data of molding equipment and different sensing data of mold interior features) corresponding to the same molding condition.

According to the exemplification described above, the molding conditions MC as inputted, the emulated sensing data $D_{ES}$, the inferred result of the quantitative item for the molding product such as the molding quality MQ inferred by the molding quality inference engine 230 (e.g. the quantitative results of molding items), the acceptance state AS (e.g. the qualitative results of molding items, which can be obtained after the data inferred by the acceptance state inference engine 240 and the acceptance state identifier 250, and then selected by the acceptance state input selector 270) can be transmitted to the module 280 for collection and analysis. The data inferred by the acceptance state inference engine 240 and the acceptance state identifier 250 may include the data extracted from the set of training data (historical data in actual process) and the emulated sensing data $D_{ES}$ from the injection molding process emulator 400 (data in non-actual process).

Moreover, in one example, the module 280 can act as a trigger of the injection molding condition optimizer 310. If the acceptance state input selector 270 determines the molding product having the qualitative characteristic corresponding to the set of emulated sensing data is in the acceptance state, the module 280 output an injection molding process state for this round of molding injection (e.g. the injection molding process state $S_k$) into the injection molding condition optimizer 310, and the last training of the molding condition optimization model for this round of molding injection is completed. Then, the injection molding condition optimizer 310 randomly reselects one set of initial molding conditions to train the molding condition optimization model for the next round of molding injection, thereby continuously training the injection molding condition optimizer 310. After the injection molding production line is operated for a period of time, the injection molding process emulator 400 and the injection molding process state observation unit 200 can be updated by observing the production results of the actual products or by setting scheduled time.

If the training of the molding condition optimization model for this round of molding injection has not been completed (i.e. the module 280 is triggered to continue the training of the molding condition optimization model), the injection molding condition optimizer 310 continues the training of the molding condition optimization model according to the injection molding process state in this round of molding injection. In one example, the injection molding condition optimizer 310 may update the molding condition optimization model according to the injection molding process state $S_k$ as simulatively formed by the injection molding process state observation unit 200 and the molding condition optimization model in this round. Then, another set of molding conditions is recommended and inputted into the injection molding process emulator 400 for conducting the process simulation (by the injection molding process emulator 400) and the process state observation (by the injection molding process state observation unit 200) for the next round of molding injection until one optimized set of molding conditions has been found, thereby completing the training of the molding condition optimization model in this round of molding injection. The details have been described above, and are not redundantly repeated.

In the embodiment, completeness of the training of the molding condition optimization model for each round of molding injection means that a set of molding condition from the injection molding condition optimizer 310 is initially inputted into to the injection molding process emulator 400, and the optimization procedure of molding condition starts based on the existing molding condition optimization model. If the module 280 determines that the molding product with the set of molding conditions is not in the acceptance state, another set of molding conditions would be recommended and inputted into the injection molding process emulator 400 to proceed the optimization procedure until the module 280 determines that the molding product with the recommended set of molding conditions is in the acceptance state, and the training of the molding condition optimization model in this round of molding injection is completed. Subsequently, the injection molding condition optimizer 310 selects a new set of molding conditions to train the molding condition optimization model again for the next round of molding injection. Initially, it may require many times (such as 20 times or more) of recommendations and adjustments of the molding conditions to obtain a molding product with the last recommended set of molding conditions in the acceptance state as determined by the module 280, so as to complete the training of the molding condition optimization model for one round of molding injection. As the number of training rounds increases, the number of the times for adjusting the molding conditions required to complete each round of molding injection decreases (i.e. the number of the times for adjusting the molding conditions required to complete each round of molding injection is gradually converged) since the system has learned how to adjust and select the molding conditions corresponding to the injection molding state from the records in the past training rounds.

Additionally, the training of the molding condition optimization model can be determined as completed preliminarily by the user according to the actual needs in the application, and the molding condition optimization model can be introduced into an injection molding production line. For example, it can be set that the training of the molding condition optimization model is preliminarily completed if a ratio of the number of the rounds that at most m times for adjusting the molding conditions required for completing each round of molding injection to the total number of consecutive rounds R is n % or more. The total number of consecutive rounds R can be equal to 10, 15, 20, 25, 30 or any appropriate number the user decided. The number of m can be 5, 4, 3, or any positive integer. The ratio of n % can be 80%, 85%, 90%, 95%, or any suitable ratio. The values of R, m and n are not particularly limited in the disclosure. In one example of R=20, m=5 and n %=95%, it means that the total number of consecutive rounds (R) is determined as 20, and the training of the molding condition optimization model can be regarded as preliminarily completed if a ratio of the number of the rounds that at most 5 times for adjusting the molding conditions required for completing each round of molding injection to the total number of consecutive rounds R (=20) is 95% or more. That is, if 19 rounds that at most 5 times (e.g., including 5, 4, 3, 2, 1 time) for adjusting the molding conditions required for completing each round of molding injection can be achieved in 20 rounds, the training of the molding condition optimization model can be regarded as preliminarily completed, and the molding condition optimization model can be introduced into an injection molding production line.

According to the injection molding condition optimizer 310 of the injection molding process optimization unit 300 in the embodiment, the molding condition optimization model constructed in the injection molding process optimization unit 300 comprises several sets of correspondence relationships between at least one molding process state and adjustment of corresponding molding conditions, wherein the several sets of correspondence relationships are respectively expected values of the adjustment of corresponding molding conditions for producing products with acceptance conditions under the at least one molding process state as inputted. In one embodiment, a neural network or the likes can be applied as the molding condition optimization model for recommending optimized molding conditions. Furthermore, the molding condition optimization model as constructed can be automatically or manually updated by a user as needed, and there is no limitation to the update frequency. The molding condition optimization model can be updated periodically or irregularly, and the disclosure has no limitation thereto.

According to the descriptions above, the injection molding condition optimizer 310 can be trained through the acceptance state classification model and the quality prediction models for the molding items. Also, a reward evaluation R corresponding to the quality state obtained from the injection molding process state observation unit 200 can be provided (such as by a reward evaluation unit RE) to the injection molding process optimization unit 300. In one example, the reward evaluation R is recorded as "+1" if the molding product as determined is in the acceptance state (e.g. the quality state of the molding product can be labelled as "True"), and the reward evaluation R is recorded as "0" or "−1" if the molding product as determined is not in the acceptance state (e.g. the quality state of the molding product can be labelled as "False").

Figure 3:
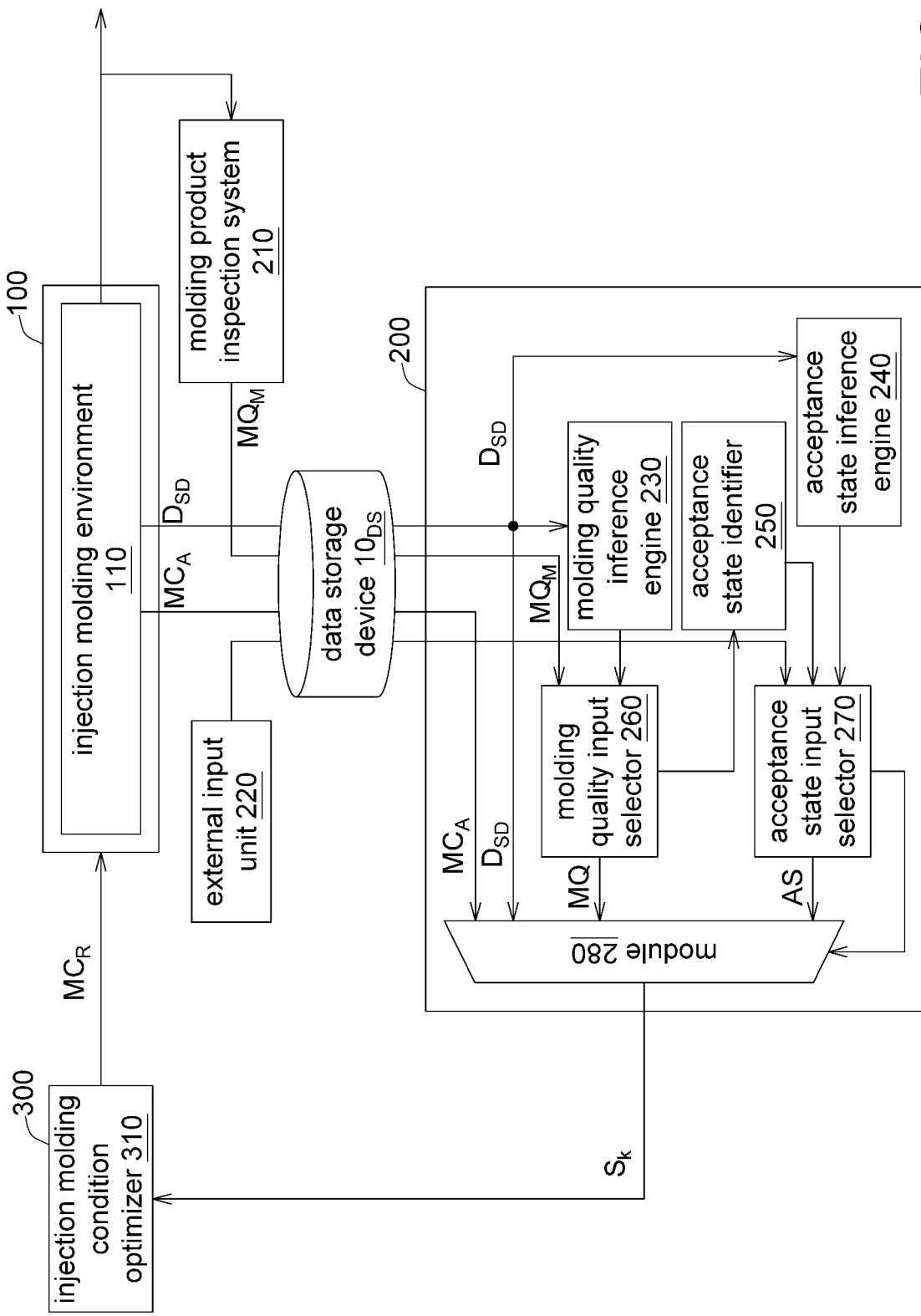
FIG. 3 is a block diagram depicting online learning of a model-based machine learning system according to one embodiment of the disclosure.

FIG. 3 is a block diagram depicting online learning of a model-based machine learning system according to one embodiment of the disclosure. Also, the block diagram of the model-based machine learning system as shown in FIG. 3 may correspond to the flow of interaction between the optimization agent 11 and the environment 10 in FIG. 1.

As shown in FIG. 3, the injection molding production line to which the model-based machine learning system of the embodiment is introduced comprises an actual injection molding process 100. The recommended molding conditions $MC_R$ (e.g. a combination of several molding parameters) from the injection molding condition optimizer 310 can be inputted into the actual injection molding process 100. Also, the actual injection molding process 100 inputs the applied molding conditions $MC_A$ and the actual sensing data $D_{SD}$ into the injection molding process state observation unit 200, wherein the applied molding conditions $MC_A$ and the actual sensing data $D_{SD}$ are also stored in the data storage device $10_{DS}$. The molding conditions (e.g. a combination of several molding parameters) and the sensing data are in sequential order and have causality; that is, the molding conditions are the cause (generated first), and the sensing data is the result (obtained consequently). The sensing data may include the sensing data related to equipment, such as the sensing data of molding equipment, the sensing data of peripheral devices, sensing data of mold interior features, etc.

In one embodiment, the actual injection molding process 100 is completed by a series of operations, such as setting of molding conditions, molding injection and production of molding product in an injection molding environment 110. The injection molding environment 110 includes the molding equipment, the molds and related peripheral equipment or auxiliary systems; for example, the mold temperature controller, the dryer, the cooling system, etc.

Also, according to the description above, the injection molding process state observation unit 200 comprises at least an acceptance state inference engine 240. The acceptance state inference engine 240 as shown in FIG. 3 infers the actual sensing data $D_{SD}$ outputted by the actual injection molding process 100 according to an acceptance state classification model (based on the set of training data or a set of renewed data) constructed in the acceptance state inference engine 240, thereby inferring a qualitative characteristic of a molding product with the actual sensing data $D_{SD}$. Therefore, the quality state at least comprising an acceptance state of a molding product from the actual injection molding process 100 can be analyzed and determined by the injection molding process state observation unit 200. In other embodiments, the injection molding process state observation unit 200 may further comprise a quantitative inference engine (such as the molding quality inference engine 230 described above), and/or other qualitative inference engine (such as the acceptance state identifier 250 described above, which performs qualitative identification by identifying the result of quantitative characteristic). The injection molding process state observation unit 200 may further comprise selector(s) related to the quantitative quality and/or qualitative quality. As shown in FIG. 3, the selectors of the embodiment may include the acceptance state input selector 270 (related to the qualitative quality) and the molding quality input selector 260 (related to the quantitative quality), which select and determine the results of qualitative or quantitative characteristics from different sources of quality results.

Moreover, the model-based machine learning system of the embodiment may further comprise a molding product inspection system 210 for sampling and measuring the actual products from the injection molding production line to obtain the actual qualities through measurement (e.g. the results of the molding items for the product as sampled can be obtained through the measurement at related equipment). The results of the actual qualities obtained by the molding product inspection system 210 (such as the molding quality of measurement $MQ_M$) can be transmitted to the molding quality input selector 260 of the injection molding process state observation unit 200. Therefore, in this example, the molding quality input selector 260 collects and analyzes results of the actual qualities from the molding product inspection system 210 and also results of quantitative characteristics corresponding to the actual sensing data $D_{SD}$ inferred by the molding quality inference engine 230 (can be updated in every round of molding injection). Accordingly, in one example, the molding quality input selector 260 can determine the quantitative quality of the actual molding products with the actual quality results according to the results of quantitative characteristics from several different sources of quality results (e.g. two sources of quality results as shown in FIG. 3). Also, the molding quality MQ is transmitted to the module 280 by the molding quality input selector 260. In one example, the selection priority of the sources of quality results for the molding quality input selector 260 is that the data from the molding product inspection system 210 is prior to the results inferred by the molding quality inference engine 230; however, the disclosure is not limited thereto.

According to the examples described above, the injection molding process state observation unit 200 may further comprise an acceptance state identifier 250, and the acceptance state identifier 250 identifies the results of the actual qualities collected and analyzed by the molding quality input selector 260 and also identifies the results of quantitative characteristics inferred by the molding quality inference engine 230 for a quality identification. Therefore, the acceptance state identifier 250 can be used for determining if a molding product with the actual qualities collected and analyzed by the molding quality input selector 260 (i.e. the actual qualities from the molding product inspection system 210) and the results of quantitative characteristics (inferred by the molding quality inference engine 230) is an accepted product in the acceptance state or not.

Moreover, the model-based machine learning system of the embodiment may optionally further comprise an external input unit 220 for inputting inspection results of acceptance state obtained by sampling the actual products produced on the injection molding production line. For example, those actual products sampled from the injection molding production line can be directly observed and identified by an inspector, and the inspection results of acceptance state can be manually inputted into a processor by the inspector.

Accordingly, the external input unit 220 can be referred as an external acceptance state input unit. In one example, the inspection results of acceptance state inputted into the external input unit 220 are transmitted to the acceptance state input selector 270. Therefore, in one example, based on several different sources of qualitative characteristics related to the acceptance state (e.g. three sources as shown in FIG. 3), the acceptance state input selector 270 can determine the molding product having the qualitative characteristic corresponding to actual sensing data is an accepted product in the acceptance state or a defective product not in the acceptance state. As shown in FIG. 3, examples of the sources of qualitative characteristics related to the acceptance state for the acceptance state input selector 270 include the inspection results of acceptance state from the external input unit 220 (can be optionally updated in every round of molding injection), the qualitative characteristic of the molding product with the actual sensing data inferred by the acceptance state inference engine 240 (can be optionally updated in every round of molding injection), and the quality results of the molding product identified by the acceptance state identifier 250 (i.e. the quality result is obtained by inferring the quantitative result from the molding quality input selector 260), wherein those results are identified and determined by the acceptance state input selector 270. The result of the qualitative item (such as the acceptance state AS) for the molding product selected by the acceptance state input selector 270 is transmitted to the module 280 for collection and analysis.

According to one embodiment, whether the molding product is in the acceptance state or not is one of the qualitative items for the molding products. In one example, the priority order of the sources for determining the acceptance state AS is the external input unit 220, the acceptance state inference engine 240 and the acceptance state identifier 250. However, the disclosure is not limited thereto.

Thus, as shown in FIG. 3, the module 280 of the injection molding process state observation unit 200 collects and analyzes the applied molding conditions $MC_A$, the actual sensing data $D_{SD}$, the molding quality MQ (from the molding quality input selector 260), and the acceptance state AS (from the acceptance state input selector 270). Moreover, in one example, the module 280 can act as a trigger of the injection molding condition optimizer 310. That is, if the molding product as determined is in the acceptance state AS (i.e. good product), online learning of the injection molding condition optimizer 310 is conducted (i.e. incremental learning, re-optimization). On the other hand, if the molding product as determined is not in the acceptance state AS (i.e. defective product), optimization of the molding conditions is performed according to the injection molding process state in this round of molding injection.

Specifically, in one example, if the acceptance state input selector 270 determines the molding product having the qualitative characteristic is in the acceptance state according to the inspection results of acceptance state from the external input unit 220, the qualitative characteristic of the molding product with the actual sensing data inferred by the acceptance state inference engine 240 and the quality results of the molding product identified by the acceptance state identifier 250, the module 280 stops triggering the injection molding condition optimizer 310 and inputs the recommended molding conditions into the actual injection molding process 100 for the next round of molding injection. Incremental learning of the injection molding condition optimizer 310 is performed on the injection molding production line batch by batch.

If the acceptance state input selector 270 determines the molding product having the qualitative characteristic is not in the acceptance state according to the inspection results of acceptance state from the external input unit 220, the qualitative characteristic of the molding product with the actual sensing data inferred by the acceptance state inference engine 240 and the quality results of the molding product identified by the acceptance state identifier 250, the module 280 triggers the injection molding condition optimizer 310 for performing optimization of the molding conditions. The injection molding condition optimizer 310 performs incremental learning according to the molding condition optimization model and the injection molding process state $S_k$ simulatively formed by the injection molding process state observation unit 200. The injection molding condition optimizer 310 recommends and inputs another set of molding conditions into the actual injection molding process 100. Alternatively, the injection molding condition optimizer 310 may train the molding condition optimization model as shown in FIG. 2, depending on actual conditions in the practical application. Details of the training have been described above and are not redundantly repeated.

Additionally, in one example, the acceptance state AS can be instantly displayed on the external input unit 220, and the user only needs to tag/mark the false predicted results of molding conditions, which can reduce the user's operation load. Also, the results of quantitative characteristics can be instantly displayed on the external input unit 220, and the acceptance identification of the molding product can be conducted by automatically comparing with the acceptance conditions inputted by the user, thereby reducing the loading on the user's operation.

Accordingly, in the embodied system as shown in FIG. 3, the injection molding process state observation unit 200 collects, infers and analyzes the data from the actual injection molding process 100, so as to simulate an injection molding process state $S_k$ of the corresponding round of molding injection. Thus, the injection molding process state $S_k$ includes the complete data produced by the actual injection molding process 100, such as the applied molding conditions $MC_A$, the actual sensing data $D_{SD}$, and the qualities of the molding products. The qualities of the molding products at least comprise the qualitative index, or comprise the qualitative index and the quantitative index. In one embodiment, the qualitative index at least comprises the acceptance state AS (based on the qualitative characteristic data sources) and other qualitative results of the molding product; for example, if there are flow marks, spray marks, etc, the results as presented may follow a binary classification. In the embodiment, the quantitative index comprises the molding quality MQ (based on the quantitative characteristic data sources) and other quantitative results of the molding product; for example, the length of the burr of the molding product, the weight of the finished product, the size of the finished product, and the degree of warpage. The injection molding condition optimizer 310 establishes a correspondence relationship between a molding process state and adjustment of molding conditions; that is, the injection molding condition optimizer 310 adjusts of molding conditions in accordance with the molding process state as inputted, and further generates one set of the optimized molding conditions as the molding conditions for the next round of molding injection. Also, in one example, the processing data for every round of molding injection can be stalled in the data storage device (the portion for storing production data) $10_{DS}$, and can be selectively synchronized to a centralized management system.

Additionally, the injection molding condition optimizer 310, the acceptance state inference engine 240 and the molding quality inference engine of the embodiment have their corresponding inference models, and they can be updated optionally in every round of molding injection. Applicable updating mechanisms of those inference models are described as follows.

When the molding product as determined is in the acceptance state (i.e. good product), the injection molding condition optimizer 310 performs incremental learning according to the adjusting data of the molding conditions;

when the molding quality inference engine 230 provides the actual results of quantitative characteristics in one round of molding injection, the molding item quality inference model constructed in the molding quality inference engine 230 performs incremental learning according to the actual results of quantitative characteristics; and When the acceptance state inference engine 240 provides the actual results of qualitative characteristics in one round of molding injection, the acceptance state classification model constructed in the acceptance state inference engine 240 performs incremental learning according to the actual results of qualitative characteristics.

Additionally, when the acceptance state inference model constructed in the acceptance state input selector 270 provides the actual results of acceptance state in one round of molding injection, the acceptance state inference model can perform incremental learning according to the actual results of acceptance state.

According to the embodiments above, the injection molding process emulator 400 can reduce the dependence of the optimization learning history of molding conditions on the actual data, and improve the efficiency of the use of the actual production data, thereby improving the learning efficiency for optimizing the molding conditions (simulation data vs. actual data of molding injection). Moreover, compared to the adjusting method of the molding conditions in the conventional process, the injection molding condition optimizer 310 of the embodiment can simultaneously adjust several parameters of the molding conditions for several different optimized targets (e.g. different quality inspection items and different acceptance conditions) to achieve the optimization of molding conditions. Thus, the model-based machine learning system of the embodiment provides a systematic and efficient adjustment mode for optimizing the molding conditions.

The injection molding process state observation unit 200 of the embodiment, including the quality inference engines (e.g. the acceptance state inference engine 240, the molding quality inference engine 230), establishes the primary conditions for the injection molding process state, which reduces the needs for marked data and assists in determining the timing of optimization of molding conditions (e.g., the module 280 functioning as a trigger).

According to the aforementioned descriptions, the embodiment provides a model-based machine learning system, which uses the injection molding process emulator 400 to construct a relational model (i.e. the molding condition optimization model) for the injection molding process state $S_k$ related to the adjustment of molding conditions. Also, the molding condition optimization model can be constructed by using a small amount of actual data, so that the amount of actual data required for constructing the molding condition optimization model can be significantly reduced. Moreover, as the numbers of training round of the injection molding condition optimizer 310 increases, the number of times for adjusting the molding conditions required in each round will gradually decrease and converge to a minimum number of times. Therefore, the system of the embodiment can quickly obtain the optimum molding conditions for injection molding. According to the experiments, the simulation results have indicated that the injection molding condition optimizer 310 after training has a probability of approximately 99.6% to achieve optimization of molding conditions within 3 rounds of molding injection (e.g. the flow in FIG. 3 depicts one round of molding injection). Thus, it is proved that the model-based injection molding condition optimizer 310 of the embodiment as provided does greatly decrease the number of rounds of molding injection required for optimizing the molding conditions. Typically, the traditional injection molding process is artificially adjusted by the experienced operators, and the operator mostly adjusts single parameter of the molding conditions for the injection process at a time. However, an injection molding apparatus applied with the model-based machine learning system of the embodiment can optimize several acceptance conditions simultaneously, and greatly reduce the processing time for finding the appropriate parameters of molding conditions, thereby efficiently obtaining a plurality of optimized molding conditions that meet the requirements of the applications (for example, different material properties required for the products and different climatic conditions of the manufacturing places have to be considered during injection molding process). When the system of the embodiment is applied to the injection molding processes for making products with complicated designs (the smaller the process window, the more the acceptance conditions to be considered), the efficiency of optimization of the molding condition has been significant improved. Therefore, the system of the embodiment has extremely high economic value and benefit in industrial application. Accordingly, the model-based machine learning system of the embodiment can solve the difficulties in evaluating the molding conditions for optimization in the injection molding processes, and also solve the problems of the big data required to deal with the artificial intelligence technical training stage. Moreover, the model-based machine learning system of the embodiment can immediately consider and acquire the quality of the molding products (i.e. the quality of the molding products can be known instantly, so that the optimization of molding conditions can be conducted in time).

The systems and exemplified contents disclosed above with accompanying drawings are provided for describing some embodiments or application examples of the present disclosure, and the present disclosure is not limited to the scopes and applications of the above structures and experimental values. In other embodiments with modified models/engines/selectors, known components of different elements can be adopted. Also, the details of the related conditions, such as the optimized molding conditions, data of related molding items, the sensing data, the acceptance state, etc., can be selected and adjusted depending on the relevant factors that may affect the actual processes in the applications. The exemplified configurations can be modified according to the needs in actual applications. The disclosure has no limitation thereto. Therefore, the systems as illustrated in the drawings are provided for exemplification purpose only, not for limiting the scope of protection of the present disclosure. Anyone skilled in the technology field of the disclosure will be able to make suitable modifications or changes based on the relevant structures of the present disclosure to meet the needs in actual applications.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A model-based machine learning system, for calculating optimum molding conditions of injection molding, the model-based machine learning system comprising:
   a data storage device for storing and processing data, wherein the data storage device stores and processes a raw data, and then provides a set of training data;
   an injection molding process emulator, generating a set of emulated sensing data according to molding conditions as inputted;
   an injection molding process state observation unit, determining an injection molding process state according to the molding conditions as inputted, the set of emulated sensing data and a quality state, wherein the quality state at least comprises an acceptance state; and
   an injection molding process optimization unit, comprising an injection molding condition optimizer based on a reinforcement learning algorithm, wherein a molding condition optimization model constructed in the injection molding condition optimizer is trained according to the injection molding process state as determined, and the molding condition optimization model after training is introduced to an injection molding production line;
   wherein the injection molding process state observation unit comprises an acceptance state inference engine, and an acceptance state classification model is constructed in the acceptance state inference engine based on the set of training data, wherein the acceptance state inference engine infers the set of emulated sensing data generated by the injection molding process emulator according to the acceptance state classification model, thereby inferring a qualitative characteristic of a molding product with the set of emulated sensing data to determine the injection molding process state;
   wherein the injection molding process emulator, the injection molding process state observation unit, and the injection molding process optimization unit are implemented by one or more logic operation units and/or processors, and the logic operation units and/or the processors include one or more of a chip, a circuit, an electric circuit board and a recording medium storing several set of codes.

2. The model-based machine learning system according to claim 1, wherein the injection molding process emulator comprises:
   a statistical parameter estimator, constructing a relational model according to practical molding conditions and individual actual sensing data distributions of the set of training data; and
   a random number generator, randomly generating a plurality of corresponding individual emulated sensing data according to emulated molding conditions as inputted into the injection molding process emulator, wherein data generation of the random number generator is based on the relational model.

3. The model-based machine learning system according to claim 2, wherein based on the practical molding conditions and statistics of the individual actual sensing data distributions of the set of training data, the statistical parameter estimator of the injection molding process emulator infers and estimates statistics of individual emulated sensing data distributions corresponding to the emulated molding conditions according to the emulated molding conditions as inputted into the injection molding process emulator, wherein the statistics of the individual actual sensing data distributions and the individual emulated sensing data distributions each comprises an average value and a standard deviation.

4. The model-based machine learning system according to claim 3, wherein the random number generator randomly generates the plurality of corresponding individual emulated sensing data according to the statistics of the individual emulated sensing data distributions as inferred and estimated, wherein several different emulated sensing data corresponding to one of the emulated molding conditions for one sensing item are generated.

5. The model-based machine learning system according to claim 1, wherein the injection molding process state observation unit further comprises an acceptance state input selector, and the acceptance state input selector determines if the molding product having the qualitative characteristic corresponding to the set of emulated sensing data is an accepted product in the acceptance state or a defective product not in the acceptance state after the set of emulated sensing data of the molding product is inferred by the acceptance state inference engine.

6. The model-based machine learning system according to claim 1, wherein the injection molding process state observation unit further comprises a molding quality inference engine, and the quality state obtained from the injection molding process state observation unit further comprises a result of quantitative characteristic.

7. The model-based machine learning system according to claim 6, wherein a molding item quality inference model is constructed in the molding quality inference engine based on the set of training data, wherein the molding quality inference engine compares the molding item quality inference model to the set of emulated sensing data generated by the injection molding process emulator, thereby inferring the result of quantitative characteristic of the molding product with the set of emulated sensing data.

8. The model-based machine learning system according to claim 7, wherein the injection molding process state observation unit comprises an acceptance state identifier and the molding quality inference engine, and the acceptance state identifier identifies the result of quantitative characteristic inferred by the molding quality inference engine for a quality identification.

9. The model-based machine learning system according to claim 8, wherein the injection molding process state observation unit further comprises an acceptance state input selector and the acceptance state identifier, and the acceptance state input selector determines if the molding product having the qualitative characteristic corresponding to the quality identification by the acceptance state identifier is an accepted product in the acceptance state or a defective product not in the acceptance state.

10. The model-based machine learning system according to claim 5, wherein the injection molding process state observation unit further comprises a module respectively coupled to the acceptance state input selector and the injection molding condition optimizer,
wherein if the molding condition optimization model is trained in one round, and the acceptance state input selector determines the molding product having the qualitative characteristic corresponding to the set of emulated sensing data is in the acceptance state, the module inputs the injection molding process state into the injection molding condition optimizer, and the injection molding condition optimizer randomly reselects one set of initial molding conditions to train the molding condition optimization model for a next round;
if the acceptance state input selector determines the molding product having the qualitative characteristic corresponding to the set of emulated sensing data is not in the acceptance state when the molding condition optimization model is trained in said round, the module is triggered and the injection molding condition optimizer continue training in said round.

11. The model-based machine learning system according to claim 1, wherein the molding condition optimization model constructed in the injection molding process optimization unit comprises several sets of correspondence relationships between at least one molding process state and adjustment of corresponding molding conditions, wherein the several sets of correspondence relationships are respectively expected values of the adjustment of corresponding molding conditions for producing products with acceptance conditions under the at least one molding process state as inputted.

12. The model-based machine learning system according to claim 1, wherein the injection molding production line comprises an actual injection molding process, recommended molding conditions from the injection molding condition optimizer is inputted into the actual injection molding process, and applied molding conditions and actual sensing data outputted by the actual injection molding process is inputted into the injection molding process state observation unit.

13. The model-based machine learning system according to claim 12, wherein the injection molding process state observation unit comprises an acceptance state inference engine, and the acceptance state inference engine infers the actual sensing data outputted by the actual injection molding process based on an acceptance state classification model constructed in the acceptance state inference engine, thereby inferring a qualitative characteristic of a molding product with the actual sensing data.

14. The model-based machine learning system according to claim 13, wherein the injection molding process state observation unit further comprises an acceptance state input selector, and the acceptance state input selector determines if the molding product having the qualitative characteristic corresponding to the actual sensing data is an accepted product in the acceptance state or a defective product not in the acceptance state.

15. The model-based machine learning system according to claim 14, further comprising an external input unit for inputting inspection results of acceptance state obtained by sampling actual products on the injection molding production line, wherein the inspection results of acceptance state are transmitted to the acceptance state input selector.

16. The model-based machine learning system according to claim 13, further comprising a molding product inspection system for sampling and measuring actual products from the injection molding production line to obtain actual qualities, and the injection molding process state observation unit further comprising a molding quality inference engine and a molding quality input selector, and the actual sensing data from the actual injection molding process further transmitted to the molding quality inference engine, wherein the molding quality input selector collects and analyzes results of the actual qualities obtained by the molding product inspection system and results of quantitative characteristics corresponding to the actual sensing data inferred by the molding quality inference engine.

17. The model-based machine learning system according to claim 16, wherein the injection molding process state observation unit further comprises an acceptance state identifier, and the acceptance state identifier identifies the results of the actual qualities collected and analyzed by the molding quality input selector and identifies the results of quantitative characteristics inferred by the molding quality inference engine for a quality identification.

18. The model-based machine learning system according to claim 17, wherein the injection molding process state observation unit further comprises an acceptance state input selector, and the acceptance state input selector determines if a molding product with quality results identified by the acceptance state identifier is an accepted product in the acceptance state or a defective product not in the acceptance state.

19. The model-based machine learning system according to claim 18, further comprising an external input unit for inputting inspection results of acceptance state obtained by sampling actual products on the injection molding production line, wherein the inspection results of acceptance state are transmitted to the acceptance state input selector, and the injection molding process state observation unit further comprises a module respectively coupled to the acceptance state input selector and the injection molding condition optimizer, wherein if the acceptance state input selector determines the molding product having the qualitative characteristic is in the acceptance state according to the inspection results of acceptance state from the external input unit, the qualitative characteristic of the molding product with the actual sensing data inferred by the acceptance state inference engine and the quality results of the molding product identified by the acceptance state identifier, the module stops triggering the injection molding condition optimizer and inputs the recommended molding conditions into the actual injection molding process for a next round of molding injection;

if the acceptance state input selector determines the molding product having the qualitative characteristic is not in the acceptance state according to the inspection results of acceptance state from the external input unit, the qualitative characteristic of the molding product with the actual sensing data inferred by the acceptance state inference engine and the quality results of the molding product identified by the acceptance state identifier, the module triggers the injection molding condition optimizer for performing optimization of the molding conditions.

20. The model-based machine learning system according to claim 1, wherein the molding condition optimization model after training is introduced into the injection molding production line for online learning.

* * * * *